United States Patent
Atcheson

(10) Patent No.: US 9,766,422 B1
(45) Date of Patent: Sep. 19, 2017

(54) OPTICAL MEMBRANE HEATING AND TEMPERATURE CONTROL METHOD AND APPARATUS

(71) Applicant: Ball Aerospace & Technologies Corp., Boulder, CO (US)

(72) Inventor: Paul D. Atcheson, Boulder, CO (US)

(73) Assignee: Ball Aerospace & Technologies Corp., Boulder, CO (US)

( * ) Notice: Subject to any disclaimer, the term of this patent is extended or adjusted under 35 U.S.C. 154(b) by 316 days.

(21) Appl. No.: 14/542,207

(22) Filed: Nov. 14, 2014

Related U.S. Application Data

(60) Provisional application No. 61/949,409, filed on Dec. 20, 2013.

(51) Int. Cl.
| | | |
|---|---|---|
| H05B 1/02 | (2006.01) | |
| G02B 7/00 | (2006.01) | |
| H05B 3/84 | (2006.01) | |
| H05B 3/22 | (2006.01) | |
| G02B 5/18 | (2006.01) | |

(52) U.S. Cl.
CPC ............ *G02B 7/008* (2013.01); *G02B 5/1842* (2013.01); *H05B 3/22* (2013.01); *H05B 3/84* (2013.01)

(58) Field of Classification Search
CPC ........ G02B 7/008; G02B 5/1842; H05B 3/22; H05B 3/84; H05B 3/86; H05B 3/023; H05B 2203/013; H05B 2203/031; H05B 2014/02
USPC ........ 219/531, 532, 543, 545, 490, 494, 548
See application file for complete search history.

(56) References Cited

U.S. PATENT DOCUMENTS

| | | |
|---|---|---|
| 1,483,125 A | 2/1924 | Singer et al. |
| 3,397,399 A | 8/1968 | Carman et al. |
| 4,550,973 A | 11/1985 | Hufnagel |
| 4,977,560 A | 12/1990 | Wantuck |
| 5,287,218 A | 2/1994 | Chen |
| 5,898,529 A | 4/1999 | Meyer et al. |
| 5,973,827 A | 10/1999 | Chipper |

(Continued)

OTHER PUBLICATIONS

U.S. Appl. No. 14/575,909, filed Dec. 18, 2014, Whiteaker.

(Continued)

*Primary Examiner* — Mark Paschall
(74) *Attorney, Agent, or Firm* — Sheridan Ross, PC

(57) ABSTRACT

Methods and systems for heating a space deployed membrane assembly are provided. The membrane assembly can include one or more framed sections. Each section can include a composite membrane having a membrane substrate and a transparent, electrically conductive resistive coating. The composite membrane is held within a frame. Electrically conductive bus bars are provided and are placed in intimate electrical contact with the resistive coating. The electrically conductive bus bars are generally arranged, on opposite sides of the perimeter of the membrane. A controller passes current between selected bus bars, with different bus bars operative to pass current between them at different times. The magnitude of the voltage applied to the bus bars, the location of the bus bars, the operational sequence of powering the bus bars, and the time over which current is passed between a selected pair of bus bars, are selected to provide substantially uniform time averaged heating of the membrane.

13 Claims, 6 Drawing Sheets

(56) References Cited

U.S. PATENT DOCUMENTS

| | | | |
|---|---|---|---|
| 6,114,671 A * | 9/2000 | Wehner | G05D 23/1934 |
| | | | 219/483 |
| 6,134,366 A | 10/2000 | Loeb et al. | |
| 6,353,421 B1 | 3/2002 | Lalezari et al. | |
| 6,426,834 B1 | 7/2002 | Braunecker et al. | |
| 6,487,342 B1 | 11/2002 | Wu et al. | |
| 6,505,381 B1 | 1/2003 | Thomson et al. | |
| 6,707,603 B2 | 3/2004 | Ansley et al. | |
| 6,888,613 B2 | 5/2005 | Robins et al. | |
| 7,557,995 B1 | 7/2009 | Lloyd | |
| 7,672,527 B2 * | 3/2010 | Arenberg | G02B 3/08 |
| | | | 359/742 |
| 7,730,925 B1 | 6/2010 | Pereira | |
| 8,664,570 B2 * | 3/2014 | Odeh | H05B 3/84 |
| | | | 219/203 |
| 9,100,996 B2 * | 8/2015 | Lisinski | H05B 3/84 |
| 2002/0071472 A1 | 6/2002 | Dickson et al. | |
| 2002/0158131 A1 | 10/2002 | Dickson et al. | |
| 2003/0206338 A1 | 11/2003 | Cook | |
| 2004/0195233 A1 * | 10/2004 | Gerhardinger | A47F 3/0434 |
| | | | 219/543 |
| 2006/0174930 A1 | 8/2006 | Murphy et al. | |
| 2010/0200777 A1 * | 8/2010 | Hauf | G02B 7/1815 |
| | | | 250/504 R |
| 2010/0319270 A1 | 12/2010 | Slade | |
| 2010/0321758 A1 * | 12/2010 | Bugno | B60R 1/088 |
| | | | 359/267 |
| 2011/0094093 A1 * | 4/2011 | Goldstein | A61N 1/368 |
| | | | 29/623.2 |
| 2011/0242663 A1 | 10/2011 | Daily et al. | |
| 2012/0012154 A1 | 1/2012 | Keller et al. | |
| 2013/0021789 A1 * | 1/2013 | Dahm | B05D 3/067 |
| | | | 362/184 |
| 2015/0352881 A1 * | 12/2015 | Seils | G02B 5/1842 |
| | | | 359/567 |

OTHER PUBLICATIONS

U.S. Appl. No. 14/587,342, filed Dec. 31, 2014, Seltzer et al.
Anderson et al. "Photon Sieve Telescope," Proceedings of SPIE, Jun. 2006, vol. 6265, 626523, 8 pages.
Hansen "Developing Lightweight Optics for Space," Science & Technology Review, Jan./Feb. 2013, 4 pages.
Meinel et al. "Large membrane space optics: imagery and aberrations of diffractive and holographic achromatized optical elements of high diffraction order," Optical Engineering, Aug. 2002, vol. 41, No. 8, pp. 1995-2007.
"First Folding Space Telescope Aims to "Break the Glass Ceiling" of Traditional Desings," DARPA News, Dec. 5, 2013, 4 pages [retrieved May 17, 2016 from: www.darpa.mil/news-events/2013-12-05].
Szondy "DARPA developing giant folding space telescope," Gizmag, Dec. 8, 2013, 6 pages [retrieved May 17, 2016 from: www.gizmag.com/darpa-folding-telescope/30039].

\* cited by examiner

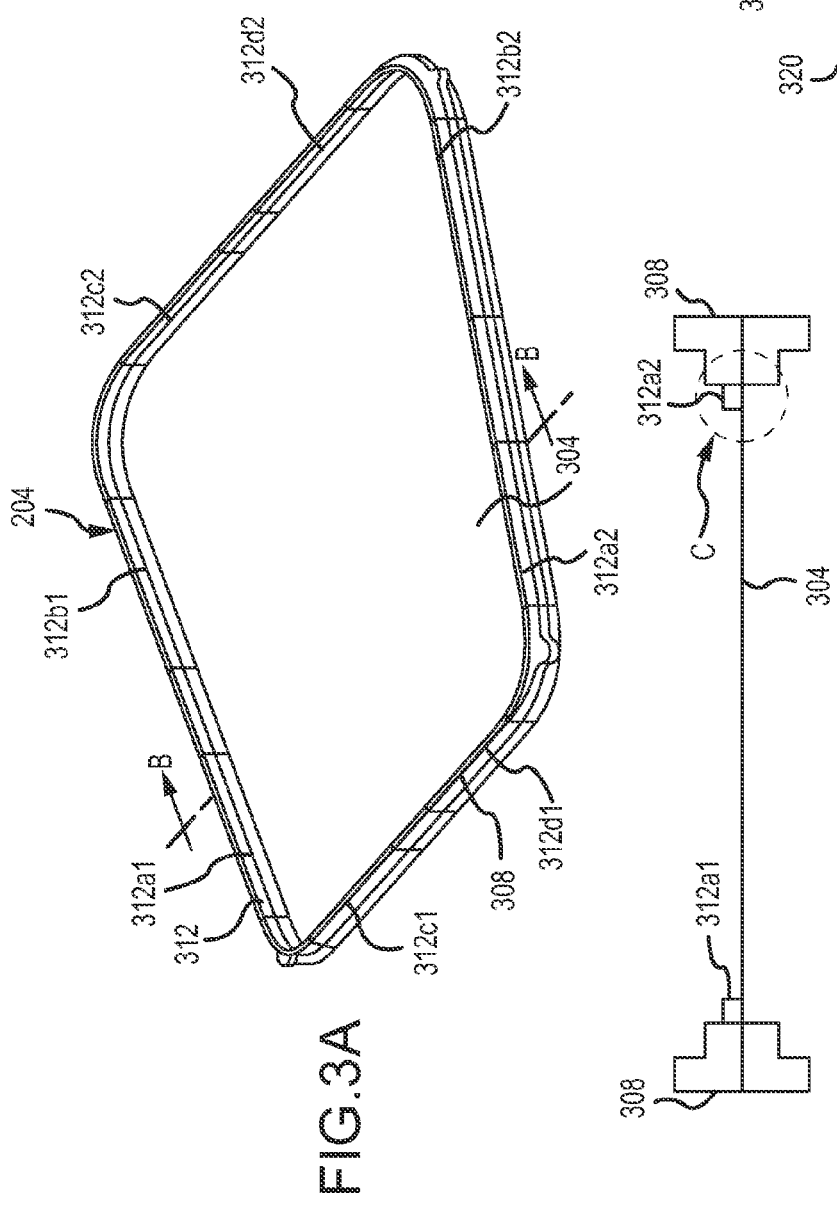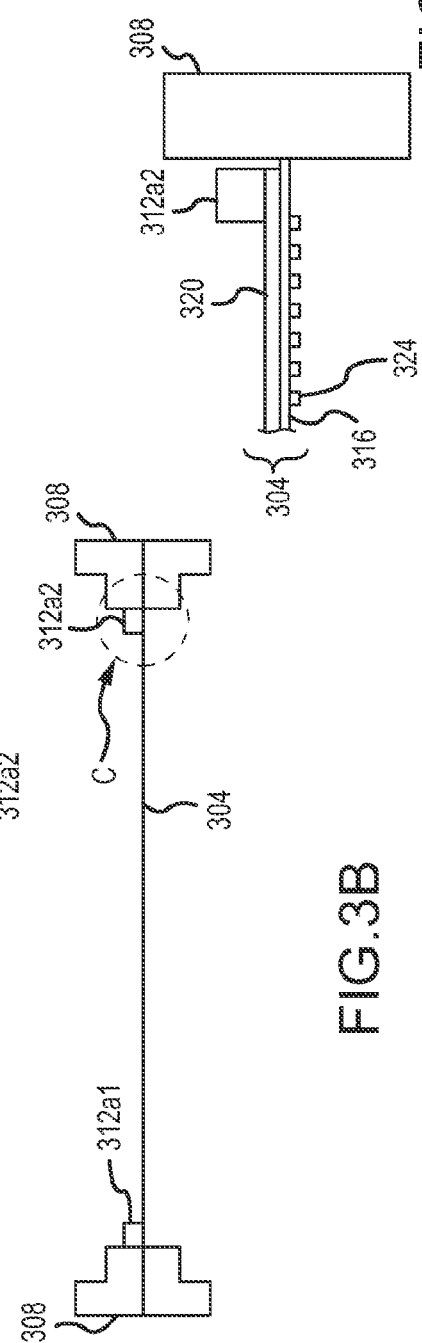

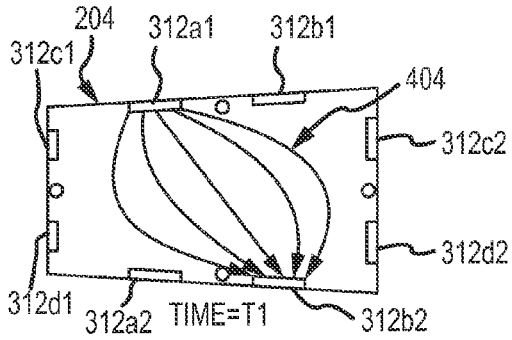
FIG.4A1
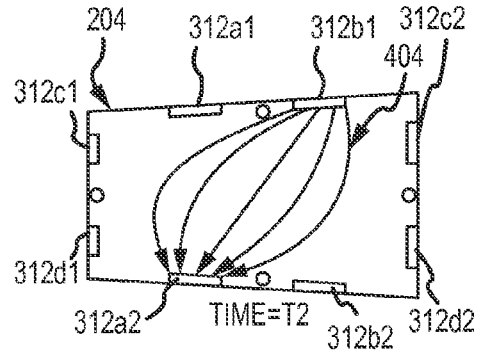
FIG.4A2
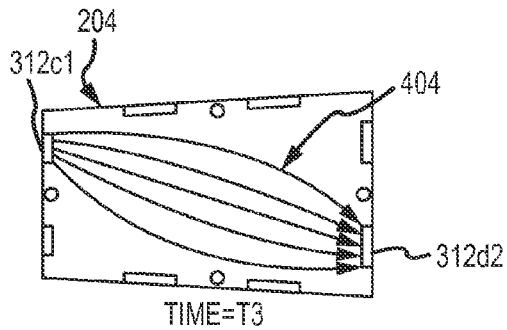
FIG.4A3
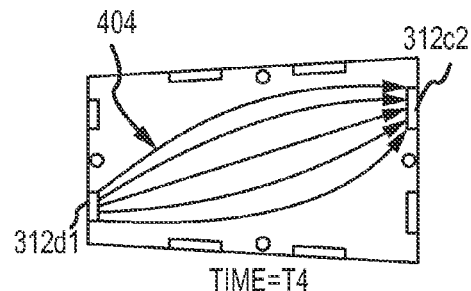
FIG.4A4
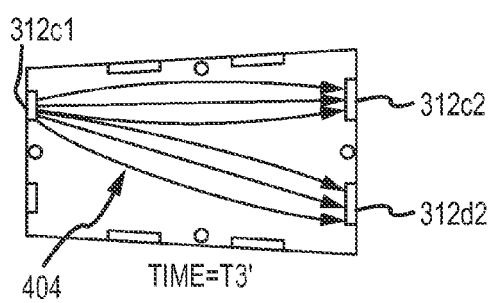
FIG.4A5
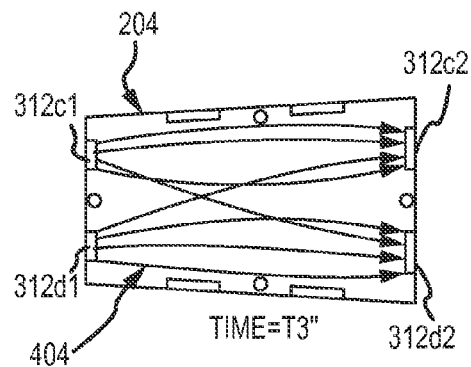
FIG.4A6
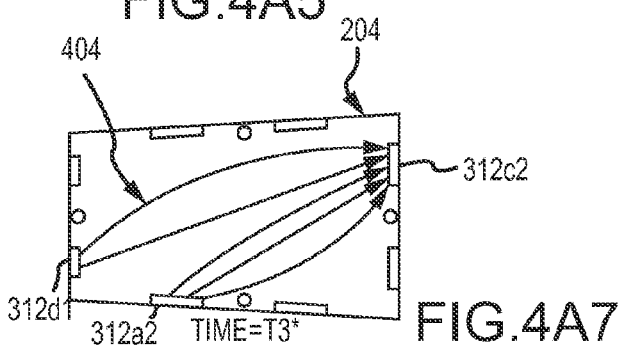
FIG.4A7

OPTICAL MEMBRANE HEATING AND TEMPERATURE CONTROL METHOD AND APPARATUS

CROSS-REFERENCE TO RELATED APPLICATIONS

This application claims the benefit of U.S. Provisional Patent Application Ser. No. 61/919,409, filed Dec. 20, 2013, the entire disclosure of which is hereby incorporated herein by reference.

STATEMENT REGARDING FEDERALLY SPONSORED RESEARCH OR DEVELOPMENT

This invention was made with government support under agreement No. HR 0011-10-C-0157 awarded by DARPA. The government has certain rights in the invention.

FIELD

Methods and apparatuses for providing heating of an insulating substrate or membrane are provided.

BACKGROUND

Membranes can be incorporated into optical devices, such as telescopes, to produce optical systems with significant mass reductions compared to optics using conventional mirror or lens technology. For example, a membrane manufactured with a diffractive focusing capability can be employed as a primary diffractive optical element in a space telescope. Membranes in space will tend to reach very cold equilibrium temperatures due to natural thermal radiation to cold space. These cold temperatures can result in the buildup of significant stress in the membrane, with the result that the membrane may tear or become permanently distorted. Even in the absence of the potential for permanent physical changes, a membrane with focusing capability that changes dimension as a function of temperature will exhibit significant differences in optical performance as a function of temperature. Correcting these changes increases the optical, mechanical, and dynamic control complexity of the optical system. Accordingly, some form of heating and temperature control is required to maintain the membrane's physical and dimensional integrity for space-based large optical systems. In addition, any heating approach must not significantly impact the optical performance, including optical throughput, of the optical system. However, controlling the temperature of a large membrane is difficult, particularly where the membrane substrate is extremely thin (e.g. about 20 microns) and has poor thermal conductance. Moreover, any approach to heating a membrane in space should heat the membrane evenly to avoid dimensional distortion. However, previous techniques available for heating circular or irregular membranes have not allowed for even heating of such membranes.

For non-optical membranes, heating and temperature control can be accomplished by incorporating heating grids into or on the surface of the membrane. However, for optical membranes, and in particular for transmissive optical membranes where structure within the optical aperture compromises the membrane's optical performance, the addition of heating grids is not practical. Transparent thin film heaters, such as Indium Tin Oxide (ITO) films, have been used for very small components where the thin film can be applied to a rectangular window. However, ITO-based heating has not been applied to meter-scale membrane structures or to meter-scale circular optical membranes. In particular, conventional ITO-based heating systems and techniques will not be effective to evenly heat a relatively large, irregularly shaped membrane, such as, but not limited to, a section of an optimal element having an overall diameter of 1 meter or larger. Radiative proximity heaters can work for components that can be surrounded, or for components with good thermal conductance. However, proximity heaters will not work for optical membranes if those heaters or components thereof block the membrane aperture from passing light properly. In addition, proximity heaters will be very inefficient if they are located outside of the membrane aperture.

SUMMARY

Embodiments of the present disclosure are directed to solving these and other problems and to overcoming disadvantages of the prior art. A system or apparatus in accordance with embodiments of the present disclosure includes an optical membrane assembly operating as an optical element that directs incident light to other optical elements in the system. The optical membrane assembly may be in the form of a framed transmissive membrane that includes a plurality of individual framed membrane sections integrated into a unifying structure. Each membrane section includes a composite membrane having a membrane substrate and a transparent, electrically conducting resistive coating, maintained in a rigid form through use of a perimeter frame. The composite membrane provides a diffractive optical pattern that is etched in or formed on the membrane substrate. The composite membrane is held within a frame, and bus bars that are in electrical contact with the electrically conductive coating are arranged around the perimeter of the membrane section. Current provided by a power supply under the control of a controller is passed between combinations of two or more bus bars, through the electrically conductive coating. The resistive heat generated within the electrically conductive coating is used to heat the membrane substrate.

Methods in accordance with the present disclosure include configuring the bus bars, resistive coating, and a control algorithm so that a time averaged current across the composite membrane will provide uniform and stable heating of the membrane. In operation, current is supplied between combinations of bus bars, such as but not limited to pairs of bus bars. The quantity of current supplied at a particular point in time or over some period of time can be controlled in response to input from one or more temperature sensors. In operation, the membrane temperature and uniformity will be determined from the balance of heat supplied from the conductive coating to the membrane substrate, radiative dissipation from the composite membrane to the space environment, and conductive heat transfer between the composite membrane and the surrounding frame.

Additional features and advantages of embodiments of the present disclosure will become more readily apparent from the following description, particularly when taken together with the accompanying drawings.

BRIEF DESCRIPTION OF THE DRAWINGS

FIGS. 3A-C depict different views of a section of a framed membrane incorporating components of a temperature control system in accordance with embodiments of the present disclosure;

FIGS. 4A1, 4A2, 4A3, 4A4, 4A5, 4A6, 4A7 and 4B depict current flow across a section of a framed membrane in accordance with embodiments of the present disclosure;

FIG. 5 depicts components of a temperature control system for a section of a framed membrane in accordance with other embodiments of the present disclosure;

FIG. 6 depicts aspects of a method for configuring a heating apparatus for a framed membrane in accordance with embodiments of the present disclosure; and FIG. 7 is a flowchart depicting aspects of a method for heating a framed membrane in accordance with embodiments of the present disclosure.

DETAILED DESCRIPTION

Figure 1:
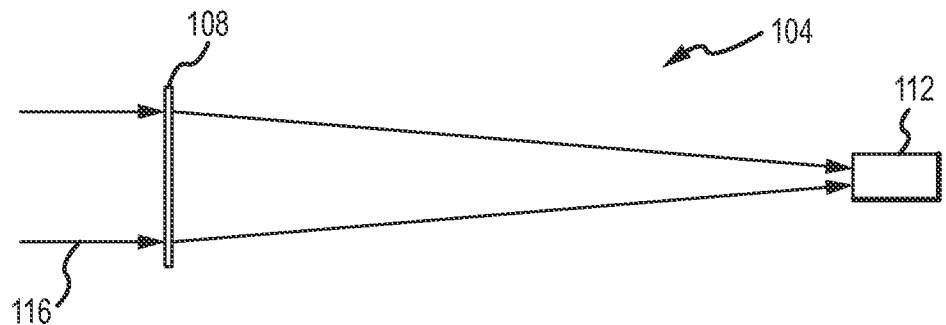
FIG. 1 depicts a space-deployed telescope incorporating a membrane with a temperature control system in accordance with embodiments of the present disclosure.

FIG. 1 depicts a space-deployed telescope 104 having an optical membrane assembly in the form of a framed transmissive membrane assembly 108 incorporating components of a heating apparatus or system in accordance with embodiments of the present disclosure. The space-deployed telescope 104 additionally includes an aft optic bench 112 for collecting the light passed by the membrane assembly 108. The framed membrane assembly 108 may comprise an optical element, such as a transmissive diffractive optical element (DOE), and may operate as a primary optical element that directs incident light 116 to optical elements included in the aft optic bench 112. As an example, but without limitation, the membrane assembly 108 may have an overall diameter of 1 meter and larger.

Figure 2:
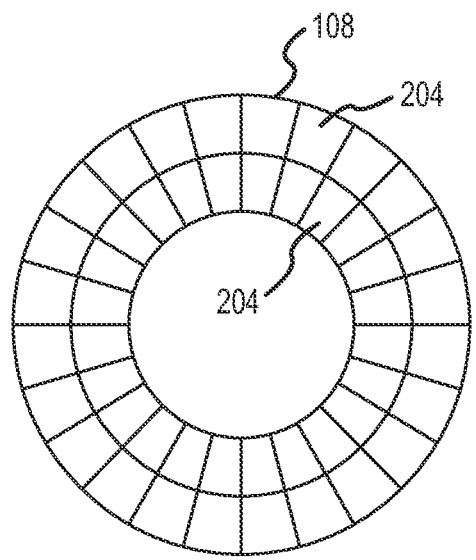
FIG. 2 depicts a membrane assembly incorporating components of a temperature control system in accordance with embodiments of the present disclosure.

FIG. 2 depicts a membrane assembly 108 in accordance with an exemplary embodiment of the present disclosure, in plan view. As shown, the membrane assembly 108 can be annular in shape, and can comprise a number of framed segments or sections 204. In the illustrated example, each of the sections 204 is generally trapezoidal in shape. Accordance with other embodiments, the sections 204 can be circular, rectangular, square, hexagonal, or any other shape. As can be appreciated by one of skill in the art after consideration of the present disclosure, the sections 204 may function in combination with one another to effectively provide a membrane assembly 108 having desired optical characteristics. In accordance with still other embodiments, the membrane assembly 108 can be formed from a single section 204, such as a single annular, circular, or other two-dimensional shape.

FIGS. 3A-3C depict an exemplary section 204 of a membrane assembly 108 in different views. In particular, FIG. 3A depicts the section 204 in a perspective view, FIG. 3B depicts the section 204 of FIG. 3A in a cross-section taken along the line B-B, and FIG. 3C depicts a portion of the cross-section shown in FIG. 3B in area C, and illustrates further details of the section 204. The section 204 includes a composite membrane 304 held in a frame 308. More particularly, the composite membrane 304 is held in the frame 308 under tension, in order to maintain a consistent surface profile (e.g., a planar profile). In addition, bus bars 312 are provided at different locations around the frame 308. The bus bars 312 can be mounted to the frame 308 such that the bus bars 312 are electrically isolated or insulated from the frame 308, for example where the frame 308 is formed from an electrically conductive material. In addition, the bus bars 312 can be located at intervals around a perimeter defined by the frame 308. Where, as in the example of FIG. 3A, the perimeter of the section 204 has sides, at least one bus bar 312 can be located on each side of the perimeter. The bus bars 312 can be arranged such that they operate in various combinations, such as but not limited to in pairs through opposite control of electrical circuitry, as discussed in greater detail elsewhere herein. The composite membrane 304 includes a membrane substrate 316 and a transparent electrically conducting, resistive layer or coating 320 (See FIG. 3C). The membrane substrate 316 can include diffractive elements 324 that form all or a portion of a diffractive pattern. For example, diffractive elements 324 forming an off-axis section of a Fresnel zone pattern can be incorporated into the membrane substrate 316 of a section 204. The diffractive elements 324 can be realized by modifying the thickness of the substrate (phase diffraction) or by modifying the optical signal transmissive strength of the substrate (amplitude diffraction). Alternatively, the phase or amplitude diffractive features 324 may be realized through a patterned application of the coating 320. The coating 320 may comprise a continuous layer of a transparent, electrically conductive material, with a non-zero electrical resistance. As used herein with respect to the coating 320, transparent means substantively (e.g., 90% or more) transmissive of one or more wavelengths of interest with respect to the telescope 104. The electrically conductive layer or coating 320 is electrically connected to the bus bars 312. As will be described in greater detail elsewhere herein, the bus bars 312 may be operated in pairs or other configurations of two or more bus bars 312, such that electrical current is passed from a first bus bar (e.g. bus bar 312a1) to a paired bus bar (e.g. bus bar 312a2). By passing current across the membrane 304, and in particular through the electrically conductive layer or coating 320, the membrane substrate 316 can be heated through its direct contact with the resistively heated coating 320.

As examples, but without limitation, the membrane substrate 316 of the composite membrane 304 may comprise a polyimide film, such as Kapton, glass, or other material that can be supplied in a thin sheet, and that can incorporate diffractive elements 324 forming all or a portion of a diffraction pattern, or that can support an optical coating comprising diffractive elements 324 forming all or a portion of a diffraction pattern. In a typical embodiment, for example using a polyimide film or glass, the diffraction pattern can be formed in or on the membrane substrate 316 using an etching process and/or deposition process, although other processes may be used. Accordingly, the membrane substrate 316 may comprise a transmissive optical element. As examples but without limitation, a membrane substrate 316 comprising a polyamide may be about 20 microns thick, while a membrane substrate 316 comprising glass may be about 200 microns thick.

The electrically conductive coating 320 is generally characterized by having uniform thickness, by having an electrical resistance, and by being transmissive to light over at least some range of wavelengths, and may be applied to one side of the membrane substrate 316. For example but without limitation, the electrically conductive layer or coating 320 may comprise an indium tin oxide (ITO) film or similar optically transmissive, electrically conducting film applied to one side of the membrane substrate 316. The thickness of the electrically conductive layer or coating 320 may be selected to provide a desired amount of electrical resistivity (described as Ohms/square). In accordance with alternate embodiments, the diffractive elements or features 324 of the composite membrane 304 may be formed in the electrically conductive layer or coating 320. In such embodiments, the electrically conductive layer or coating 320 may provide desired phase diffraction or amplitude diffraction characteristics to the desired composite membrane 304. In accordance with still other embodiments, the conducting film may be omitted where the diffractive elements 324 are incorporated into a transparent, electrically conductive resistive membrane substrate 316. In this embodiment the bus bars would be in intimate electrical contact with the membrane substrate and current would pass through the membrane substrate 316.

Figure 7:
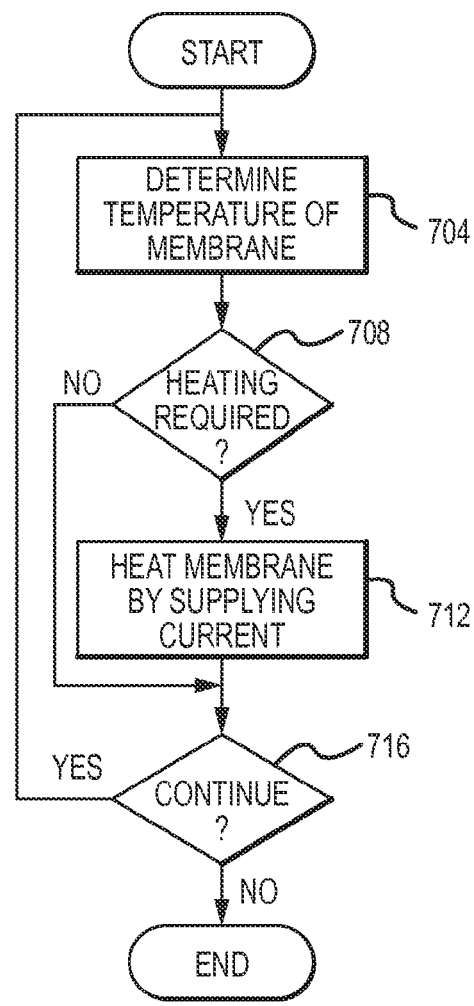

FIGS. 4A1-4A7 depict a section 204 of a membrane assembly 108 in accordance with an exemplary embodiments of the present disclosure, and in particular depicts current flow between different combinations of bus bars 312 at different times. In this example, the section 204 is trapezoidal, however the concept of current flow between bus bars and current density apply for any shape of membrane section 204. In generally, embodiments of the present disclosure pass current through the coating 320 between opposed bus bars 312 to provide resistive heating of the membrane 304. Moreover, the time averaged heating of the membrane 304 is controlled, through the selection of active bus bars 312, the amplitude of the current, and the time at which selected bus bars 312 are active, to maintain the membrane 304 within a desired temperature range and spatial temperature uniformity. As can be appreciated by one of skill in the art after consideration of the present disclosure, the desired temperature range and spatial temperature uniformity will depend on the coefficient of thermal expansion of the membrane 304, the allowable membrane 304 tension, and the allowable membrane 304 dimensional change. FIG. 4A1 depicts the exemplary section 204 at time T1. In this example, current 404 passes from a selected source bus bar 312$a$1 to a selected receiving bus bar 312$b$2. As depicted, and as can be appreciated by one of skill in the art after consideration of the present disclosure, the current 304 will tend to disperse as it flows between the selected bus bars 312. In particular, the current tends to spread out in a nonuniform manner based on the membrane shape and the coating conductivity. The source bus bar, in the example of FIG. 4A1, bus bar 312$a$1, can be supplied with a positive voltage, while the receiving bus bar, in this example bus bar 312$b$2, can be provided with a negative voltage, to create current flow 404. In general, the bus bars 312 selected as the operative bars 312 at a particular point in time, the time that the current is passed between the bus bars, and the amount of current, can all be controlled so that the effective heating of the section 204 is sufficiently uniform.

A further exemplary current flow at time T2 is depicted in FIG. 4A2. In this example, a different pair of bus bars 312$b$1 and 312$a$2 are operative. As yet another example, at time T3, another pair of bus bars 312$c$1 and 312$d$2 are operative, as shown in FIG. 4A3. At time T4, yet another pair of bus bars 312$d$1 and 312$c$2 are operative to produce a current flow 404.

Alternatively or in addition, more than one bus bar 312 may be operated at a particular point in time as a source or as a receiver of current. As an illustration of such an embodiment, at time T3', depicted in FIG. 4A5, a single bus bar 312$c$1 is operated as a source of current 404, while bus bars 312$c$2 and 312$d$2 are operated as receivers of current 404. As yet another example, depicted in FIG. 4A6, two bus bars 312$c$1 and 312$d$1 are operated as a source of current 404, and two bus bars 312$c$2 and 312$d$2 are operated as receivers of the current 404, at time=T3". As a further example, depicted in FIG. 4A7, two bus bars 312$a$ and 312$d$, are operated as sources of current 404 and bus bar 312$c$2 is operated as a receiver of the current at time T3*. Although various embodiments have been presented, it should be appreciated that embodiments of the present disclosure are not so limited. Instead, other combinations may be applied. Moreover, different combinations and sequences of combinations may be applied in the operation of a system for heating an optical membrane in accordance with embodiments of the present disclosure.

Figure 4B:
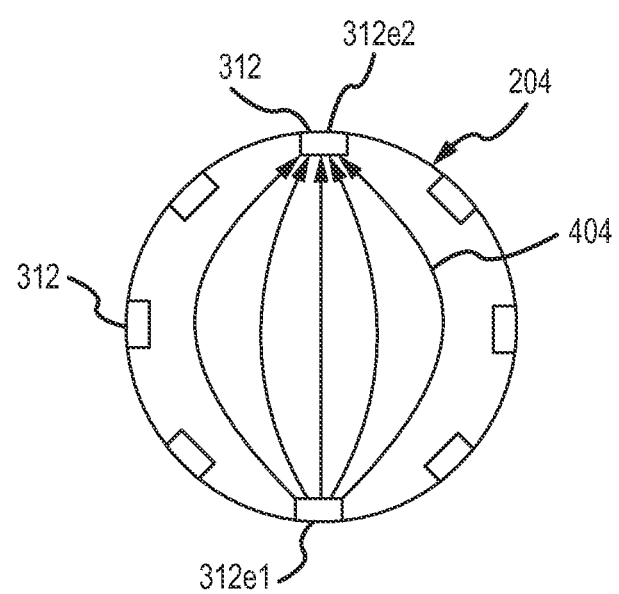

FIG. 4B depicts a section 204 of a membrane assembly 108 in accordance with another exemplary embodiment of the present disclosure, and in particular depicts current flow between bus bars 312 included in a first pair of bus bars 312$e$. In operation, different pairs of bus bars 312 can be selected in sequence, to effectively move around the perimeter of the membrane 304. In this example, the section 204 is circular, however the concept of current flow between generally opposed pairs of bus bars 312 and current density are essentially the same for any shape of section 204. As shown, current, depicted as lines 404, travels from a first one of the bus bars 312$e$1 to a second one of the bus bars 312$e$2. In addition, the current tends to spread out, with the resulting current density being relatively high proximate to the operating bus bars 312, and relatively low in areas relatively distal from the operating bus bars 312.

In accordance with embodiments of the present disclosure, the current may be supplied as a direct current (DC). In addition, the current can be switched on and off, and can be supplied between different selected pairs of bus bars 312 at different times, in order to achieve a sufficiently uniform time-averaged current density, so as to in turn effect a sufficiently uniform heating of the membrane 304 of the section 204. The voltage applied between bus bar 312 pairs, the number of bus bar 312 pairs, the size of individual bus bars 312, and the proximity of individual bus bars 312 to other bus bars 312 can also be selected in order to provide a sufficient amount of heat to the membrane substrate 316, and to provide sufficiently uniform heating of the membrane substrate 316. In accordance with still other embodiments, the number of individual bus bars 312 to which current is supplied can be different from the number of bus bars 312 at which current is received. As used herein, sufficiently uniform heating means that the time-averaged heating of the membrane 304 is relatively constant across the area of the membrane 304, so that the dimensions of the optical features of the membrane substrate 304 are maintained at a desired value or within a desired range of values. Moreover, the amount of heating is controlled so as to maintain the temperature of the membrane 304 at a desired temperature or within a desired range of temperatures.

Figure 5:
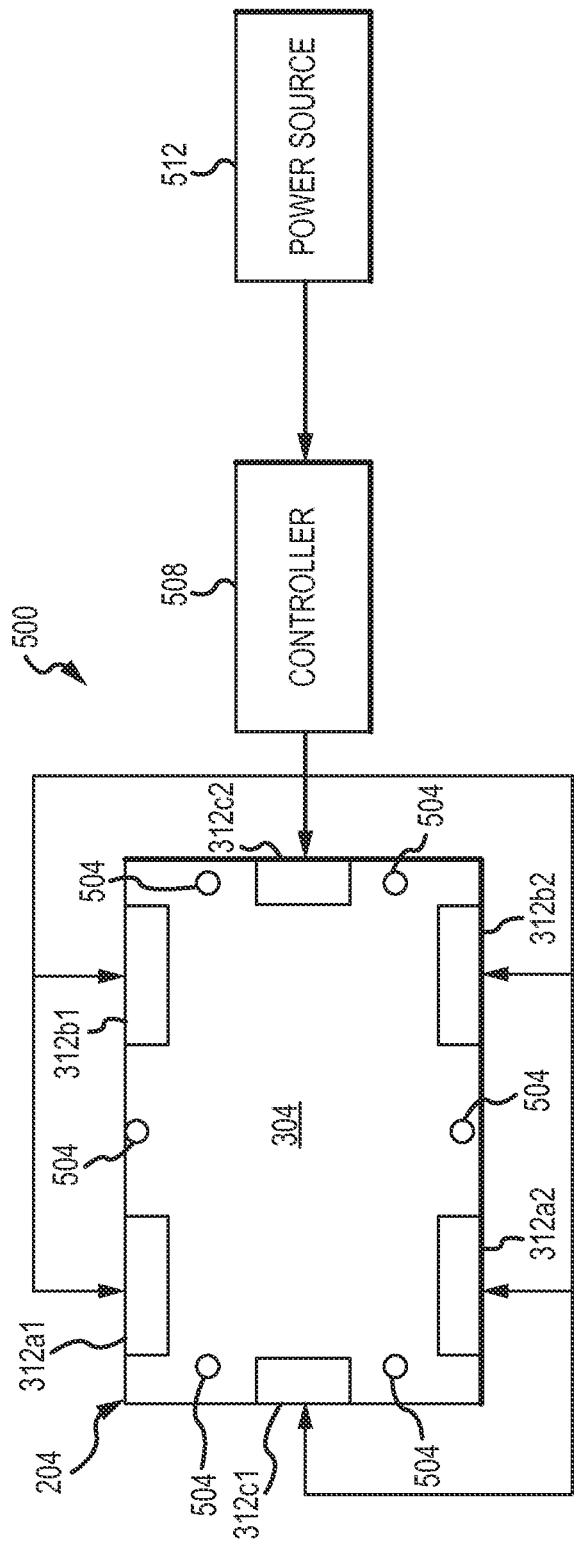

FIG. 5 is a block diagram depicting components of a system 500 for heating a membrane 304 of a section 204 included in a membrane assembly 108 in accordance with embodiments of the present disclosure. The system 500 generally includes a section 204, and one or more pairs of bus bars 312. In addition, the section 204 can be associated with one or more temperature sensors 504. The system 500 also includes a controller 508 and a power source or supply 512. The controller 508 operates to control the voltages and/or provide current between different selected bus bars 312 for selected periods of times to maintain the membrane 304 within a desired temperature range, and to thus maintain the desired optical characteristics of the membrane 304. More particularly, the controller can operate to provide substantially uniform time averaged heating of the membrane 304, where substantially uniform is determined by the coefficient of expansion of the membrane 304, and the optical tolerance of the optical characteristics of that membrane 304 in the context of the telescope 104 or other optical device incorporating the membrane assembly 108 of which the section 204 having the membrane 304 is a part. In a typical implementation, the current is provided as a DC current. In accordance with other embodiments, an AC current can be supplied. The sequence and time during which current is supplied between pairs of bus bars 312 can be selected so that a substantially uniform time-averaged current density, and therefore a substantially uniform heating, of the membrane substrate 320 of the membrane section 204 is achieved. By providing one or more temperature sensors 504, feedback can be provided to the controller 508, allowing the heating effect to be varied according to ambient conditions. The controller 508 may be implemented as a programmable processor, associated or integrated memory, and programming or instructions for implementing a current control algorithm to achieve substantially uniform heating as described herein. Moreover, the controller 508 can operate so as to provide a positive voltage at a bus bar 312 operating at a particular point in time as a source of current and to provide a negative voltage at a bus bar 312 operating at that point in time as a current sink. The power supply 512 can comprise a battery, fuel cell, solar array, or other source or sources of electrical power.

Figure 6:
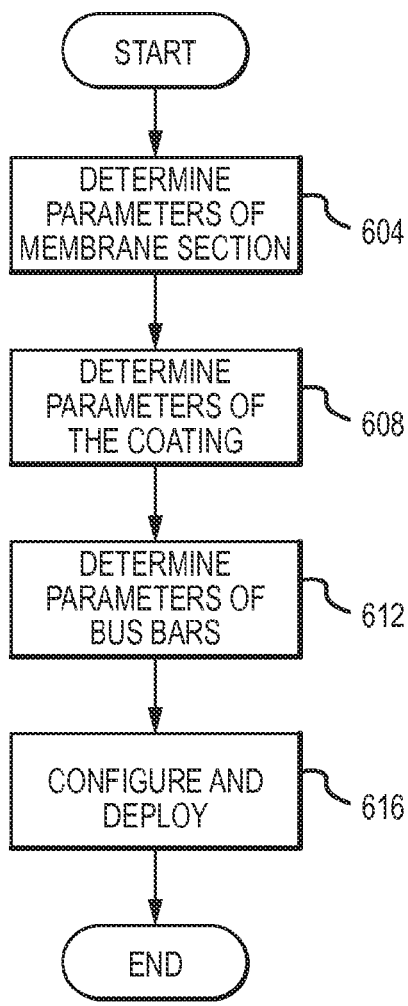

FIG. 6 depicts aspects of a method for configuring a heating apparatus for a large membrane in accordance with embodiments of the present disclosure. Initially, the parameters of a membrane section 204 are determined (step 604). Such parameters can include the two-dimensional shape of the section 204 in plan view, the diffraction pattern incorporated in or applied to the membrane substrate 316, the material of the membrane substrate 316, the coefficient of thermal expansion of the material, and the like. Next, the parameters of the coating 320 can be determined (step 608). Such parameters can include the particular material selected for the coating 320 and the thickness of the coating 320, in view of the desired resistivity of the coating 320 in terms of Ohms/square. At step 612, the number, size, and arrangement of bus bars 312 can be determined. In a typical configuration, bus bars 312 will be provided along at least most of two opposing sides of the membrane section 204. In accordance with still other embodiments, bus bars 312 can be provided along all or at least most of the sides of the membrane section 204. In addition, the bus bars 312 can be arranged so that adjacent bus bars 312 are close (i.e. nearly touching) one another. The bus bar 312 pairings or associations can also be determined. For example, bus bars that are across from one another, on opposite sides of the membrane section 204, can be operated as pairs, with current being supplied across the membrane 304 between pairs of bus bars 312. Alternatively, bus bars 312 within a pair need not be directly across from one another, and can instead be at any location relative to one another. As yet another alternative, a pairing of bus bars can comprise an association of more than two bus bars. For instance, for a given pulse or instance of current, current can be supplied to one or more bus bars 312 and received at one or more other bus bars 312. Finally, at step 616, the membrane section 204 can be configured, incorporated into a large membrane 108 of a telescope 104, and deployed.

FIG. 7 is a flowchart depicting aspects of a method for heating an optical membrane in accordance with embodiments of the present disclosure. At step 704, the temperature of the composite membrane 304 is determined. This can include providing a signal from a temperature sensor 504 to a controller 508 running programming implementing aspects of the method. A determination can then be made as to whether heating of the composite membrane 304 is required (step 708). This determination can include, for example, whether the temperature of the composite membrane 304 is below an acceptable temperature range. If a determination is made that heating is required, resistive heating of the composite membrane 304 can be initiated (step 712). In accordance with embodiments of the present disclosure, resistive heating can include providing a signal from the controller 508 to a power source 512, and/or operating switches, so as to provide a flow of current across at least a portion of the composite membrane 304 within the membrane section 204. Where the membrane section 204 is rectangular, the flow of current can simply be passed between a single pair of bus bars 312 that extend across opposing sides of the membrane section 204, to effect uniform current density within the film coating and uniform heating of the composite membrane 304. Alternatively, where the membrane section 204 is not rectangular, the controller 508 can operate to pass current between different pairs of bus bars 312. In general, the quantity of current and the bus bars 312 between which the current is supplied are selected so that the current density, averaged over time, is substantially equal across the membrane section 204. By providing substantially equal amounts of time-averaged current density across the membrane section 204, all portions of that membrane section 204 will be heated by the same amount. Accordingly, the temperature of the composite membrane 304 can be maintained within an acceptable range, and temperature differences across different portions of the composite membrane 304 can be maintained within acceptable limits. As can be appreciated by one of skill in the art after consideration of the present disclosure, the determination of the quantity of current supplied to pairs of bus bars 312, the selection of pairs of bus bars 312, and the time over which current is supplied to selected pairs of bus bars 312 can be fixed or pre-programmed. In addition, the effect of the frame 308 and the bus bars 312 themselves on the heat capacity of areas of the membrane section 204 in proximity to such components can be taken into account when determining the current supply pattern. Alternatively or in addition, the supply of current can be modified based on input from temperature sensors 504 associated with the membrane section 204, and/or with other components of the membrane 108.

At step 716, a determination can be made as to whether operation of the heating system 500 should be continued. If operation is to be continued, the process can return to step 704. Otherwise, the process may end.

As can be appreciated by one of skill in the art after consideration of the present disclosure, embodiments of the present disclosure can be used to provide heating of membrane 304 sections having diffractive elements 324 that are incorporated into a membrane assembly 108 that is provided as part of a space deployed telescope 104. In addition, embodiments of the present disclosure can be used in connection with sections 204 of membrane assemblies that are irregular, such as non-rectangular, in shape. However, embodiments of the present disclosure are not so limited. For example, the membrane assembly may include a single, unitary membrane 304, rather than a plurality of sections. In addition, embodiments of the present disclosure may be used in connection with a membrane assembly 108 of any size, and that is intended for various purposes. For instance, a membrane assembly 108 incorporating a heating system as discussed herein can include a reflective element. Moreover, the membrane assembly 108 need not be deployed in space or on orbit. Furthermore, the membrane assembly 108 is not limited to optical elements with a diameter of 1 meter or more, but instead may be applied to optical elements of any size.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described hereinabove are further intended to explain the best mode presently known of practicing the invention and to enable others skilled in the art to utilize the invention in such or in other embodiments and with various modifications required by the particular application or use of the invention. It is intended that the appended claims be construed to include alternative embodiments to the extent permitted by the prior art.

What is claimed is:

1. A membrane section, comprising:
    a frame;
    a composite membrane, including:
        a membrane substrate, wherein the membrane substrate includes diffractive elements; and
        an electrically conductive layer, wherein the composite membrane is held within a perimeter of the frame;
    at least two bus bars, wherein the at least two bus bars are electrically connected to the electrically conductive layer of the composite membrane.

2. The membrane section of claim 1, wherein the frame includes at least four sides, and wherein at least two bus bars are electrically connected to the composite membrane at each of the four sides, whereby the membrane section includes at least eight bus bars.

3. The membrane section of claim 2, wherein at least one of the at least four sides has a different length than at least three of the at least four sides.

4. The membrane section of claim 1, wherein the electrically conductive layer is transparent to light within at least a first range of wavelengths.

5. The membrane section of claim 1, wherein the diffractive elements include a pattern of variations in a thickness of the membrane substrate.

6. The membrane section of claim 1, wherein the diffractive elements include a pattern of variations in an optical transmission characteristic of the membrane substrate.

7. The membrane section of claim 1, wherein the electrically conductive layer is an electrically conductive coating.

8. The membrane section of claim 1, wherein the membrane substrate includes an optical coating comprising the diffractive elements.

9. A method for heating a section of a membrane assembly, comprising:
    passing an electrical current across at least a first portion of a composite membrane included in the section during a first period of time between at least first and second bus bars electrically connected to the composite membrane, wherein the composite membrane includes diffractive elements, wherein the composite membrane is electrically conductive, and wherein passing an electrical current across at least the first portion of the composite membrane raises a temperature of the first portion of the composite membrane;
    passing an electrical current across at least a second portion of the composite membrane included in the section during a second period of time between at least third and fourth bus bars electrically connected to the composite membrane, wherein passing an electrical current across at least the second portion of the composite membrane raises a temperature of the second portion of the composite membrane.

10. The method of claim 9, wherein the composite membrane is held within a frame, wherein the frame defines a perimeter of the membrane, and wherein the bus bars are not electrically connected to the frame.

11. The method of claim 10, wherein a perimeter of the composite membrane held within the frame is not rectangular.

12. The method of claim 9, wherein the first and second bus bars are on first and second sides of the perimeter of the composite membrane respectively.

13. The method of claim 12, wherein the first and second sides of the perimeter of the composite membrane are opposite one another.

* * * * *